United States Patent [19]
Yoffe

[11] Patent Number: 4,790,497
[45] Date of Patent: Dec. 13, 1988

[54] POINT-LANDING METHOD FOR NON VERTICAL TAKE OFF AND LANDING FLYING OBJECTS

[76] Inventor: Meir Yoffe, 27 Haluts Street, Holon 58435, Israel

[21] Appl. No.: 58,815

[22] Filed: Jun. 5, 1987

[51] Int. Cl.$^4$ ............................................. B64F 1/00
[52] U.S. Cl. ................................... 244/115; 244/116; 244/110 F; 244/110 R
[58] Field of Search .................... 244/115, 116, 110 R, 244/110 C, 110 F, 110 G, 114 R

[56] References Cited

U.S. PATENT DOCUMENTS

| | | | |
|---|---|---|---|
| 1,806,655 | 5/1931 | Traver | 244/115 |
| 3,801,050 | 4/1974 | Stone | 244/115 |
| 3,980,259 | 9/1976 | Greenhalgh et al. | 244/116 |

Primary Examiner—Galen Barefoot
Assistant Examiner—Rodney Corl
Attorney, Agent, or Firm—Mason, Fenwick & Lawrence

[57] ABSTRACT

The present invention relates to a point landing method for a flying object, e.g., an aircraft (manned or unmanned), a helicopter, a missile, in a location which may be stationary, e.g., a ground plot or the roof of a building or a moving one, e.g., a car, ship, train.

13 Claims, 4 Drawing Sheets

POINT-LANDING METHOD FOR NON VERTICAL TAKE OFF AND LANDING FLYING OBJECTS

The present invention relates to a point-landing method flying objects.

The aviation world has for a long time recognized the need for the landing of flying objects at a pre-determined point for civil and military purposes. Such possibility avoids the requirement of a landing strip and overcomes difficulties due to unsatisfactory topographical situations, time limits or the like.

The possibility to land a flying object at a specific point can at the present moment be fulfilled only by vertically landing flying objects, such as helicopters. However, these are relatively expensive and aerodynamically inefficient due to their rotary-wing lift and propulsion and the associated expensive and heavy accessories. Moreover, said known methods are not always satisfactory.

However, so far no such method is known to land a non-vertically flying object even in such a manner.

It has thus been desirable to find a satisfactory point landing method for flying objects. e.g. an aircraft, a missile, a helicopter, etc, at a pre-determined location. Said location may be stationary, e.g. a ground plot or the roof of a building; or a moving platform, e.g. a car, train, ship, etc., provided that said location has sufficient place to locate a accessories required and the flying object itself, which may be manned or unmanned. (All said locations will be called hereinafter "location". Said method should be relatively simple, not require complicated machinery and/or much man-power and skill.

The present invention thus consists in a point landing method for a flying object at a pre-determined location (as herein defined) comprising the following steps:
 a. the flying object is flown horizontally towards the retrieval apparatus mounted on the location;
 b. the flying object releases a trailing cable or pole carrying at its end a hooking-up device;
 c. the flying object moves said hooking-up device towards a trap being part of said retrieval apparatus and thus causes said device to hook-up in another cable which is held in said trap and is rolled on a winch mounted on said location;
 d. the winch releases such a length of said cable required for the continuation of the flight of said flying object and its subsequently manouvres in accordance with the take-over speed of the flying object relative to the speed of the location;
 e. the flying object is mannoeuvered to a landing starting point and the excessive relative speed is bled off; and
 f. the moment the flying object reaches the landing starting point the winch rolls the cable up and together the flying object towards the location, controlling the cable speed continuously in order to achieve a minimal but safe airspeed of the flying object, until said flying object is caught by the retrieval apparatus.

A retrieval apparatus in connection with the present invention comprises a winch, a cable rolled on said winch, the collecting apparatus and optionally a control box, sensors, etc. Said apparatus may be a single unit, however, if desired, some parts, e.g. the collecting apparatus, may be placed at a separate place.

The landing starting point is advantageously located downwind from the position of the collecting apparatus.

The means for reducing the relative speed may be any conventional one, e.g. a combination of tensioning the cable, e.g. by the winch and/or by maneuvering the flying object horizontally and/or vertically.

The relative speed should be as low as possible and is preferably zero, .e. the speed of the flying object and that of the moving location are advantageously the same in the course of the landing operation.

The minimal safe airspeed is achieved by using lift and/or drag increases or augmenters, for example, flaps, parachutes, deployment of additional surfaces, lifting thrust, etc. At the stage of controlling the airspeed of the flying object by controlling the cable speed, i.e. in the course of the landing operation itself, the engine may be shut off.

The flying object being retrieved will advantageously make use of maximum relative airspeed on its surfaces, be it comprised by any natural wind prevailing in the area or artificial wind caused by the motion of the location. For this purpose the location, if it is a movable one, advantageously moves at its maximum speed and directs its movement directly opposite the wind.

The safe airspeed (vertical and/or horizontal) of the flying object is advantageously ascertained by using airspeed measurements on the flying object, the cable tension calibrated for this purpose or the like.

All said operations may be performed by a pilot, if present, manually, or by any suitable autonomous instrumentation system or by commands given from the location, e.g. by remote control, radio, etc. There may be used passive or active guidance aids, manually or automatically. Said guidance aids should advantageously be able to operate at all hours of day and night, in conditions of visibility and nonvisibility and in any weather.

The method according to the present invention uses, advantageously, various technical tolerances which allow:

non accurate height of flight thus enabling water and/or ground touching and dragging of the cable or pole;

non accurate flight path by enlarging the size of the cable trap;

non accurate manual operation by inclusion of various artificial aids; and non accurate trailing cable positioning by inclusion of means to make the cable trap move n relation to the location in order to catch the cable in lateral, vertical or roll directions or in any other kind of motion for the purpose of stabilizing the trap against the location motion or for otherwise improving the hook-up process.

The method according to the present invention uses, advantageously, means to cushion or catch the flying object at the impact/touchdown point facilitating the final contact with the collecting apparatus, such as nets, airbags, springs, limit switches and limiters on the cable, winch stoppage, air blowers, crucible materials, energy absorbing means and the like, engaging the flying object at a suitable place.

The winch may be actuated manual y or automatically by methods known per se. Should it be desired more than one winch may be present, e.g. one on the location and on the flying object.

In a modification of the method according to the present invention part of the retrieval apparatus, in particular the winch and the cable rolled thereon and the trap, are positioned on the flying object and the trailing cable with the hook and a suitable launching or throwing device are positioned on the location.

The present invention w now be described with reference to the accompanying drawings without being limited by them. In said drawings:

FIG. 1a is shows the landing of an aircraft on the ship shown in FIG. 1;

FIG. 2a shows the landing of an aircraft on the car shown in FIG. 2;

FIG. 3a shows the landing of an aircraft on the house shown in FIG. 3;

Identical parts appearing in various FIGS. are marked by the same reference numerals.

Figure 1:
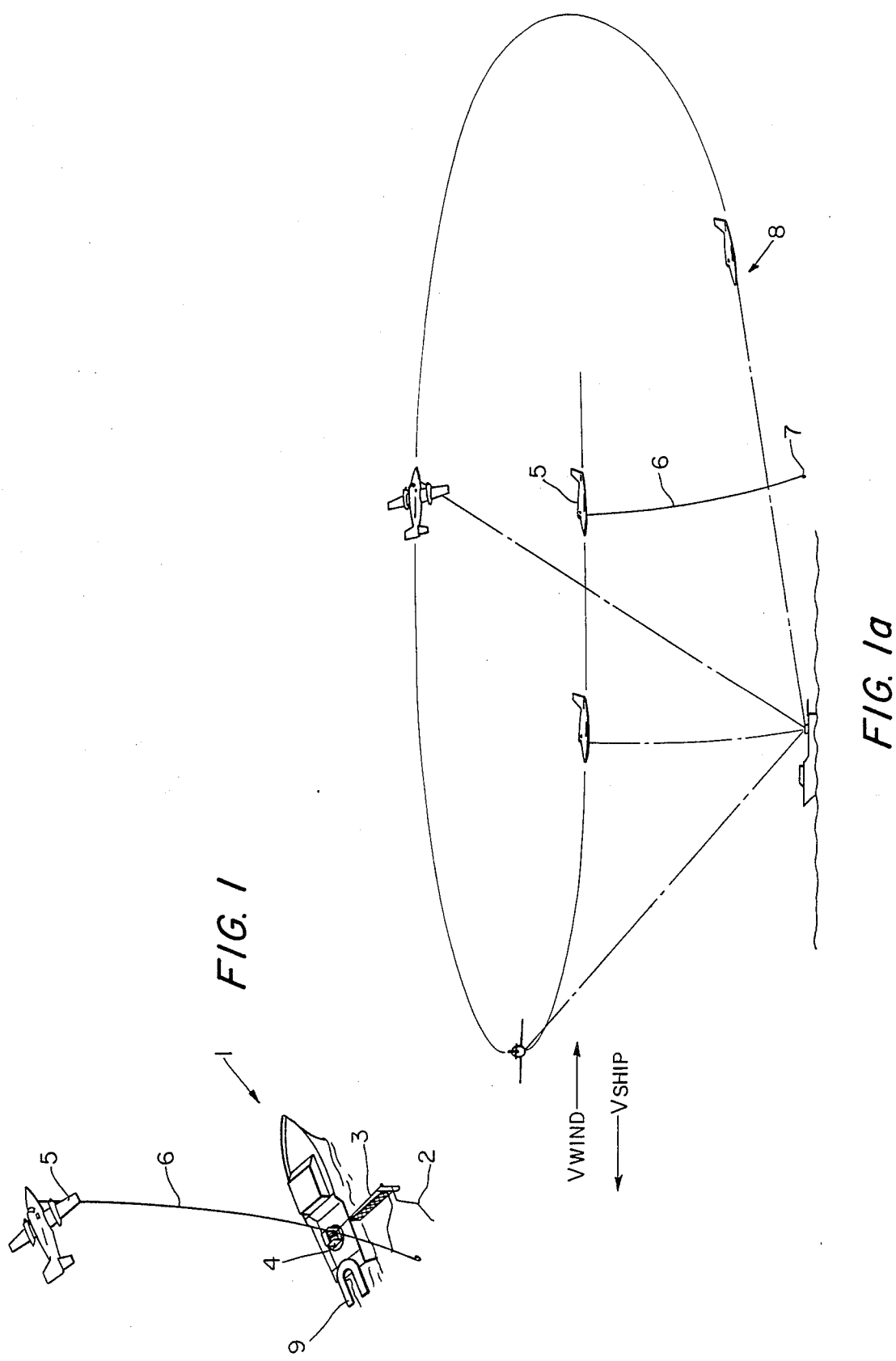
FIG. 1 shows a ship provided with a retrieval apparatus.
Figure 2:
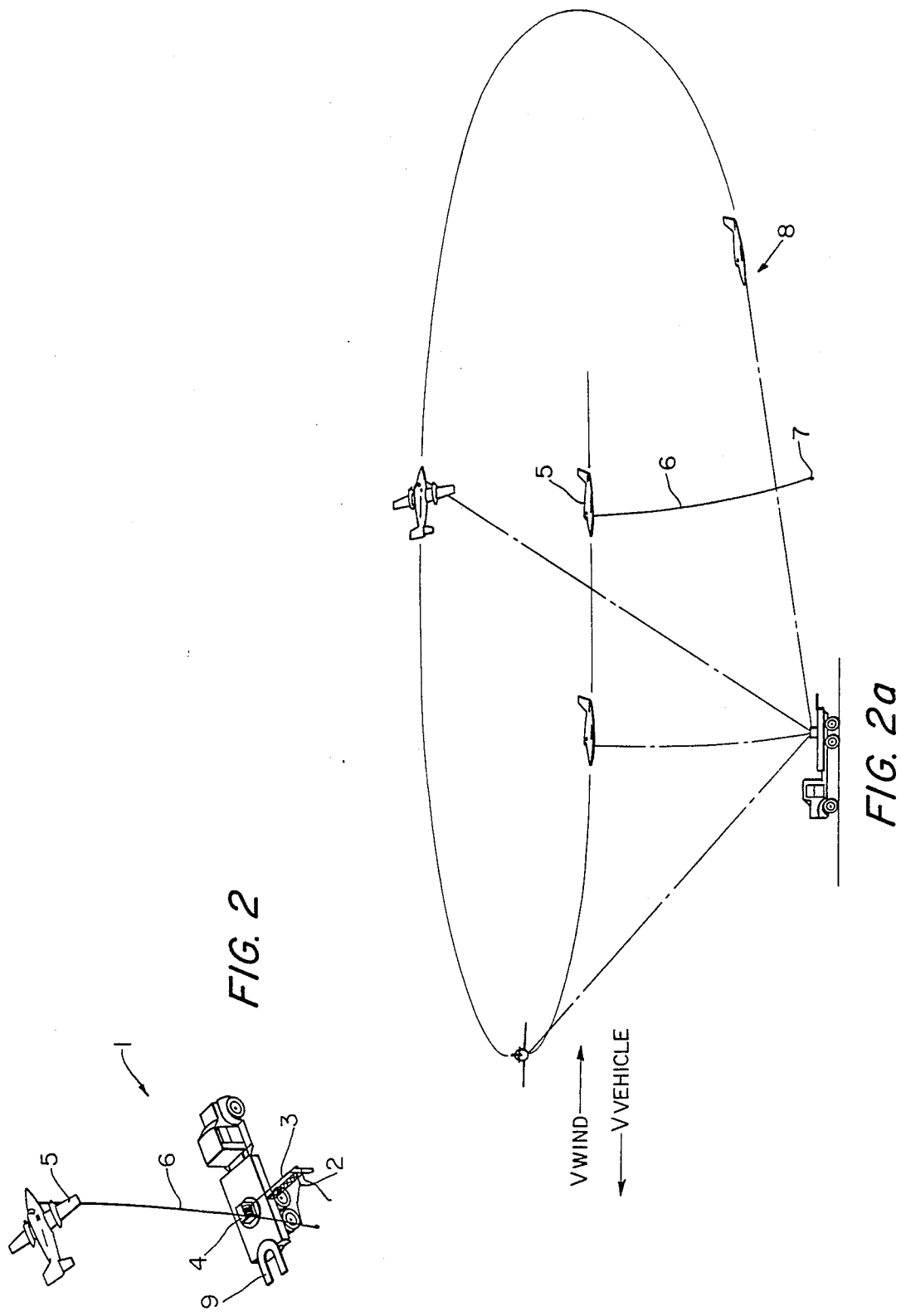
FIG. 2 shows a car provided with a retrieval apparatus.
Figure 3:
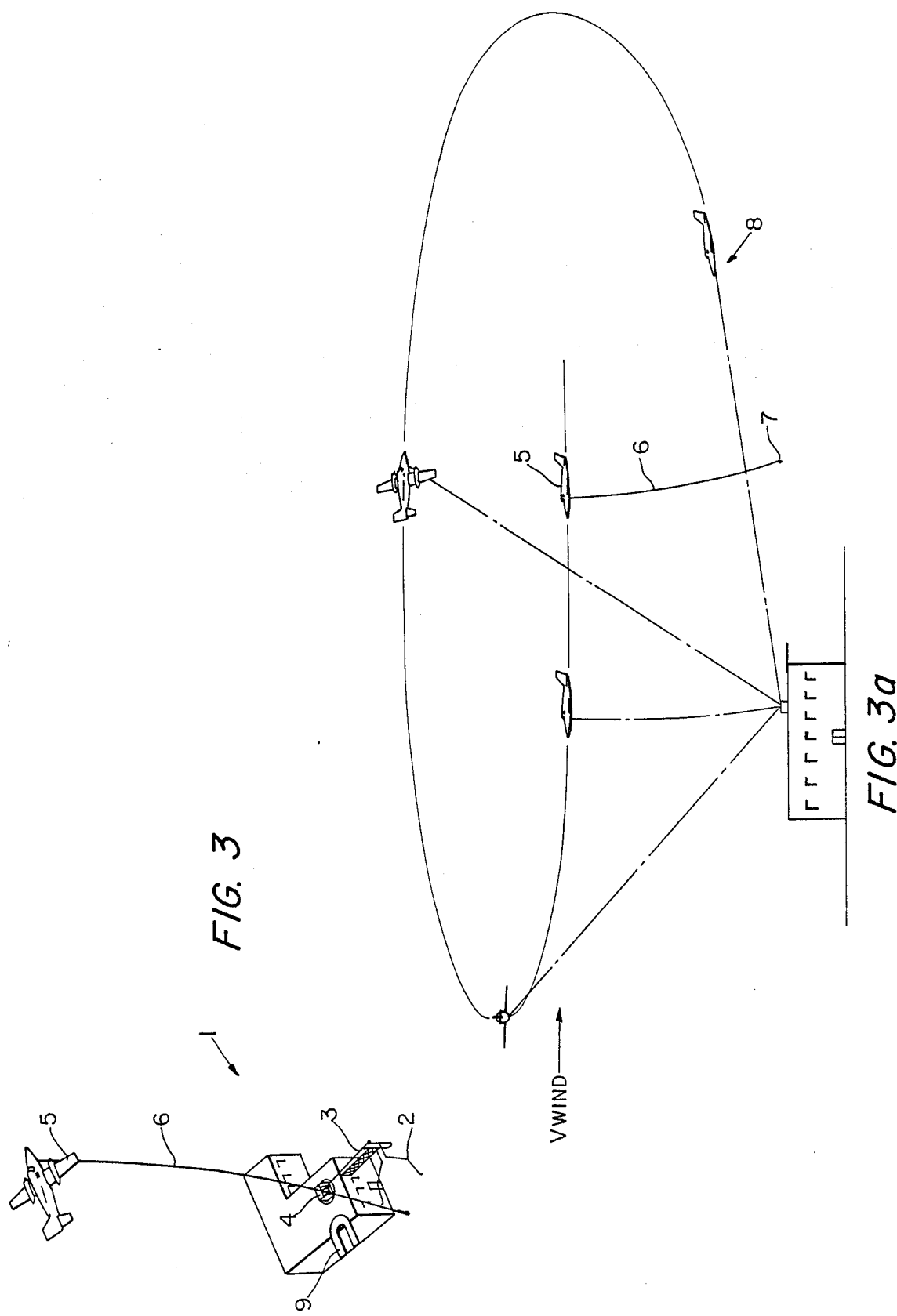
FIG. 3 shows a house provided with a retrieval apparatus.

In all locations, namely the ships (FIGS. 1 and 4), the car (FIG. 2) and the house (FIG. 3) retrieval apparatus 1 is mounted on the respective location. Said apparatus 1 comprises in particular cable hook 2, cable 3, winch 4 and collecting apparatus 9. The various additional guiding means which are self-understood to the man of the art are not shown in detail.

The landing operation is performed as follows:

Aircraft 5 releases cable 6 at the end of which is positioned hooking-up device 7. Said device 7 is caught by trap 2 and hooked-up n cable 3. Winch 4 releases the length of cable 3 required for the continuation of the flight of aircraft 5 and its subsequent mannoeuveres.

Aircraft 5 is then mannoeuvered by suitable means to landing starting point 8 in the manner illustrated in FIGS. 1a, 2a, 3a and 4a. The speed is, if required, bled off by suitable means.

The moment aircraft 5 reaches landing starting point 8, winch 4 reels it towards the location at a controlled speed of cable 3 which ensures the safe flight speed of aircraft 5, which benefits from the prevailing wind and the wind caused by the movement of the location. Finally aircraft 5 is caught by collecting apparatus 9 at a minimal relative speed.

Figure 4:
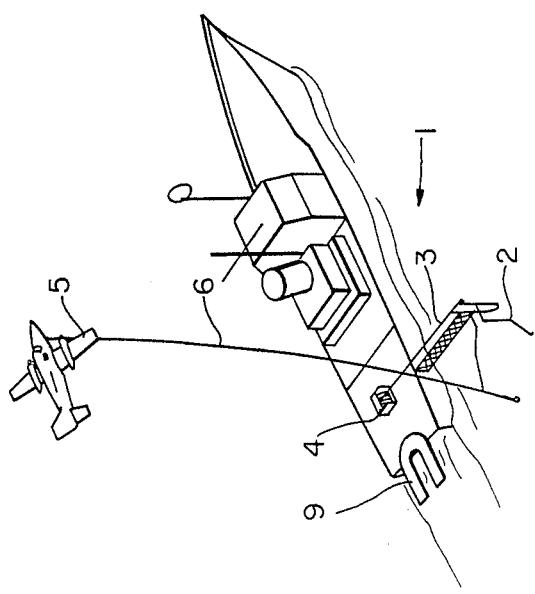
FIG. 4 shows another ship provided with a retrieval apparatus.
Figure 4A:
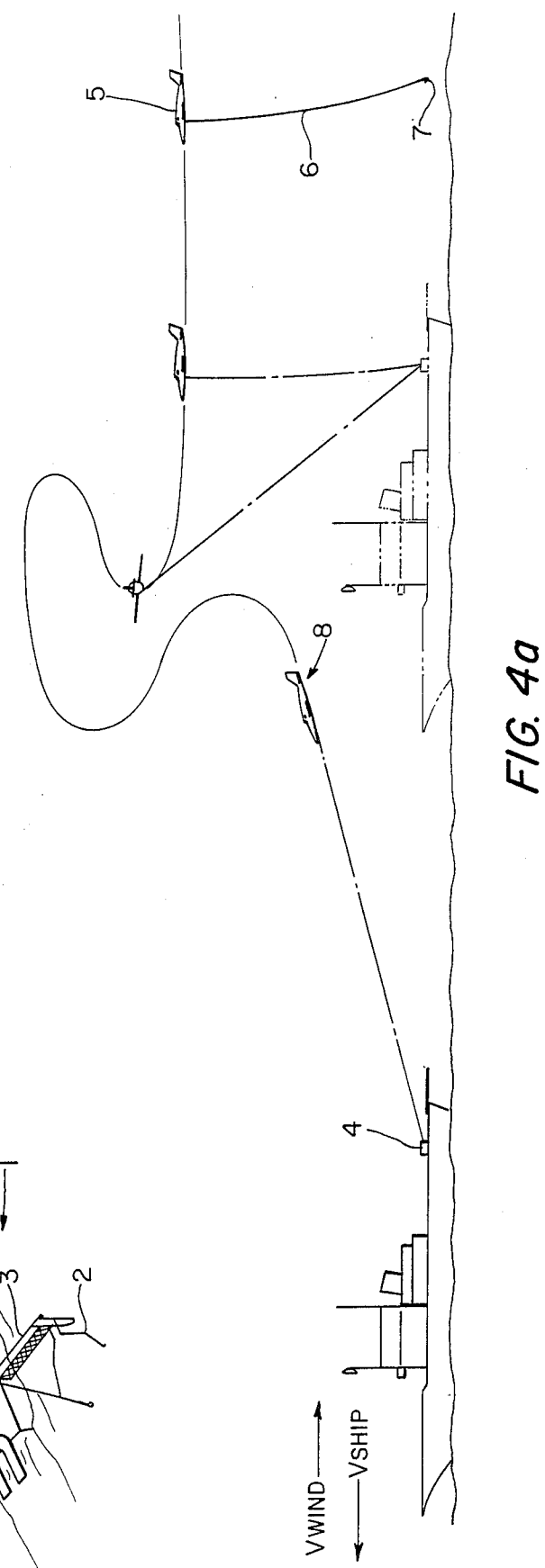
FIG. 4a shows the landing of an aircraft on the ship shown in FIG. 4.

In the embodiment shown in FIGS. 4 and 4a the take off speed of aircraft 5 is bled off using a lateral mannoeuvering which is performed while the ship continues its forward movement. Thus aircraft 5 is positioned at landing starting point 8.

I claim:

1. A method for landing a flying object at a point location comprising:
   (a) flying a flying object substantially horizontally towards a retrieval apparatus including a cable and winch mounted on the location,
   (b) releasing from the flying object a trailing cable or pole carrying at its end a hooking up device,
   (c) causing said hooking up device to engage the cable of the retrieval apparatus,
   (d) continuing the flight of the flying object and causing the winch to unwind the cable during the continuing flight,
   (e) maneuvering the flying object to a landing starting point at a reduced speed,
   (f) causing the winch to pull in the cable at a rate to maintain the flying object at or above minimal safe airspeed, and
   (g) catching the flying object with said retrieval apparatus.

2. A method according to claim 1, wherein the flying object is an aircraft.

3. A method of claim 1, wherein the flying object is a helicopter.

4. A method according to claim 1, wherein the retrieval apparatus is maintained stationary.

5. A method according to claim 1, wherein the retrieval apparatus is moved during the landing of the flying object.

6. A method according to claim 1, wherein the retrieval apparatus is maintained at a single place during the landing of the flying object.

7. A method according to claim 1, wherein the retrieval apparatus comprises several parts, and positioning said parts at several places prior to causing the hooking up device to engage said cable.

8. A method according to claim 1, wherein the relative speed is reduced by tensioning the cable and/or by maneuvering the flying object horizontally and/or vertically.

9. A method according to claim 1, wherein the minimal safe airspeed is achieved by deploying a lift and/or drag increaser.

10. A method according to claim 1, wherein the maneuvering is performed by a pilot of the flying object.

11. A method according to claim 1, wherein the maneuvering is by autonomous instrumentation.

12. A method according to claim 1, wherein the maneuvering is performed by the use of remote control apparatus.

13. A method for landing a flying object at a point location comprising:
   (a) flying a flying object having thereon a winch, a cable wound on said winch, and engaging means carried by said cable,
   (b) flying the flying object towards a location having thereat a cooperating engaging means and a launching means thereat,
   (c) deploying said cable and engaging means from said flying object by unwinding said winch,
   (d) actuating said launching device to engage said cooperating engaging means with said engaging means,
   (e) continuing the flight of the flying object and causing said winch to unwind the cable during the continuing flight,
   (f) maneuvering the flying object to a landing starting point at a reduced speed,
   (f) causing the winch to pull in the cable at a rate to maintain the flying object at or above minimal safe airspeed, and
   (g) catching the flying object with retrieval apparatus mounted at the location.

* * * * *